Figure 6:
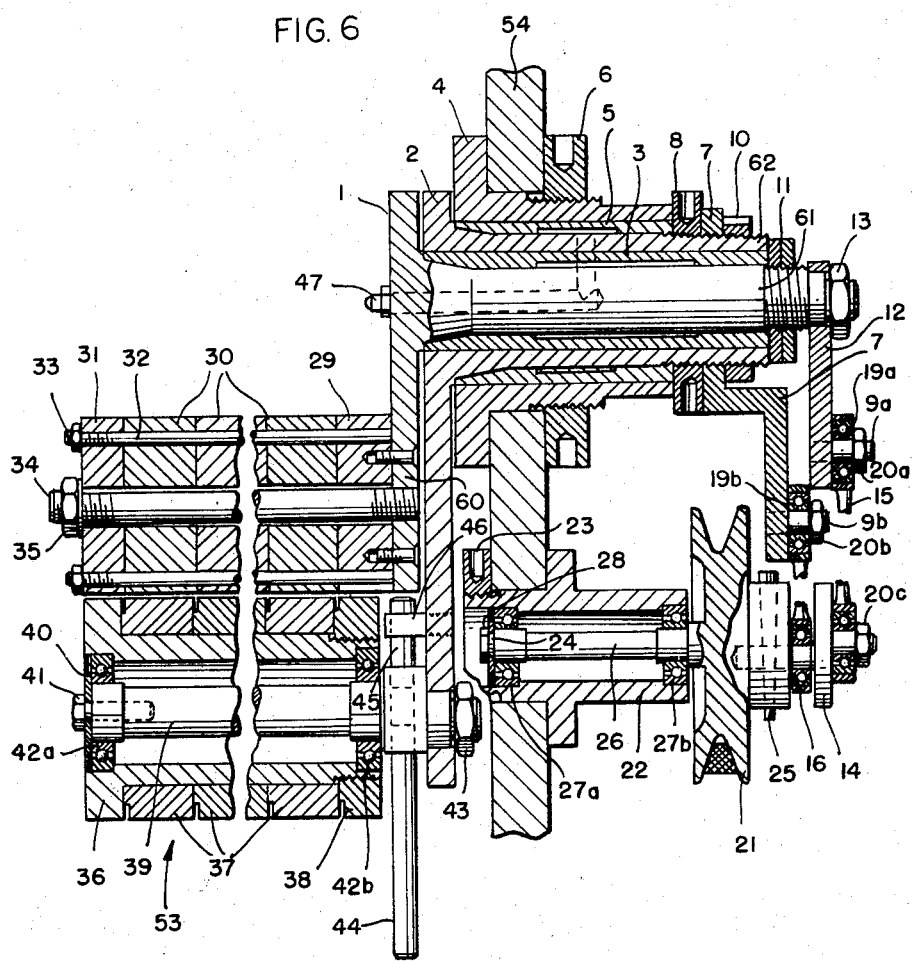

April 29, 1969   A. DIEBOLD ET AL   3,441,232
CUTTING APPARATUS FOR PLASTIC SHEETING
Filed Jan. 15, 1965
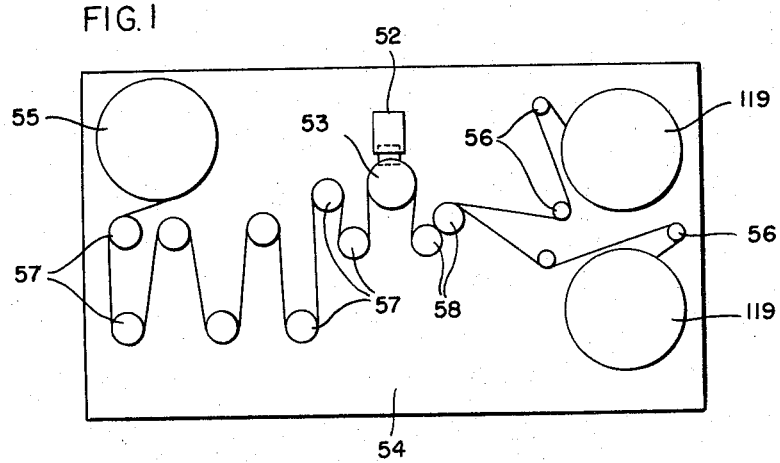
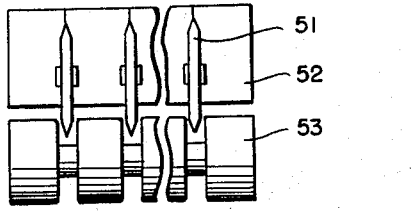
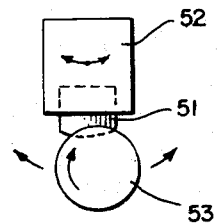
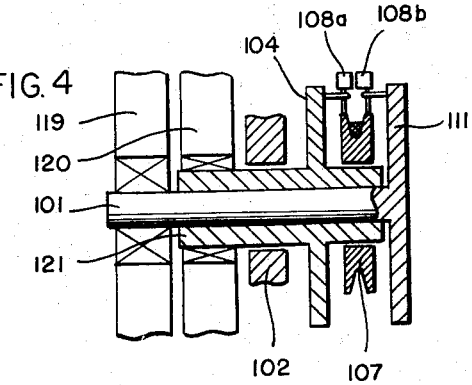
INVENTORS:
ADOLF DIEBOLD
LUDWIG RAICHLE
WILHELM DUSSEL
BY
Marzall, Johnston, Cook & Root
ATT'YS

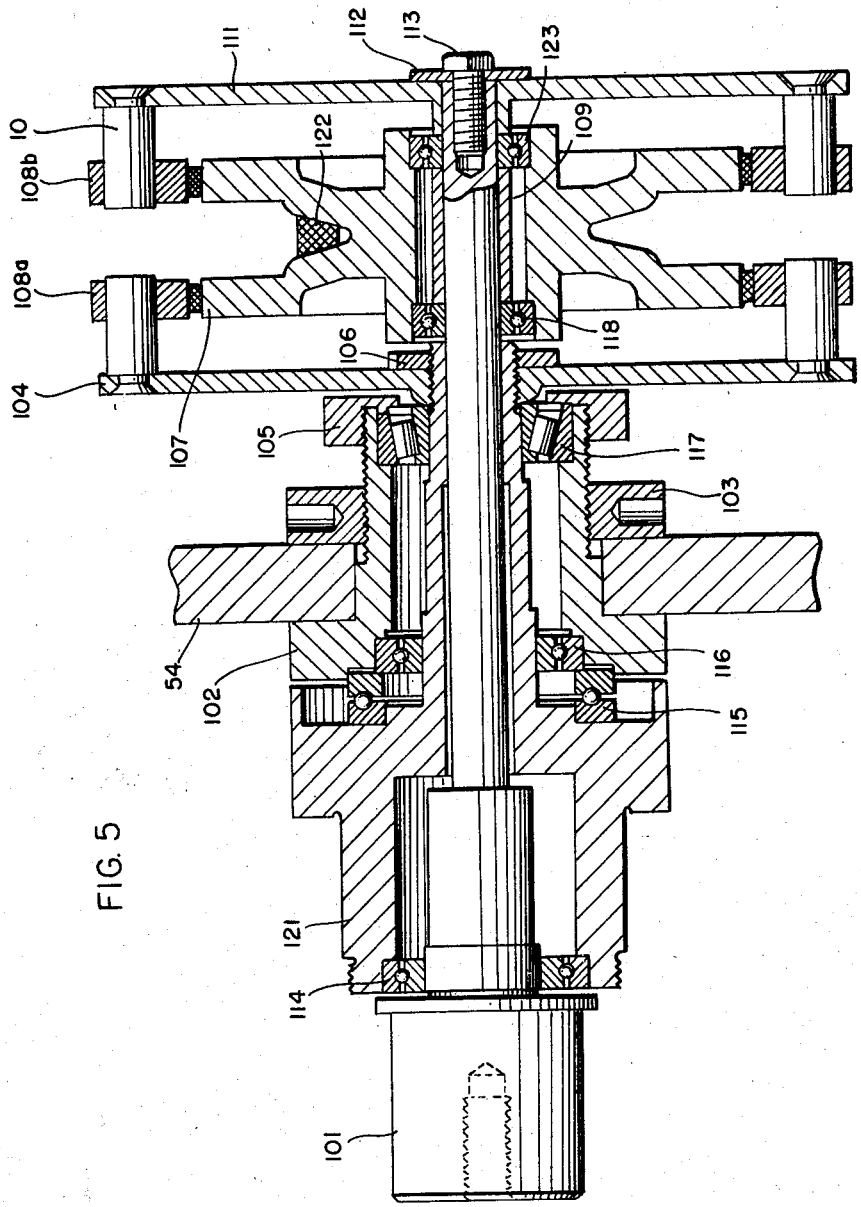

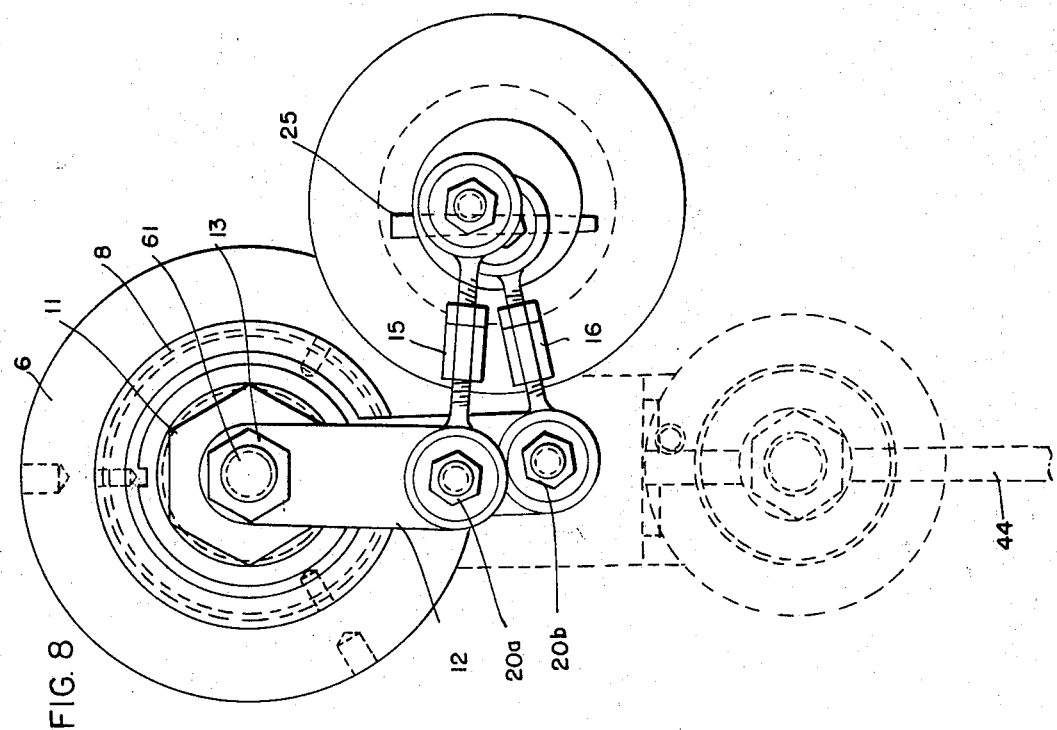
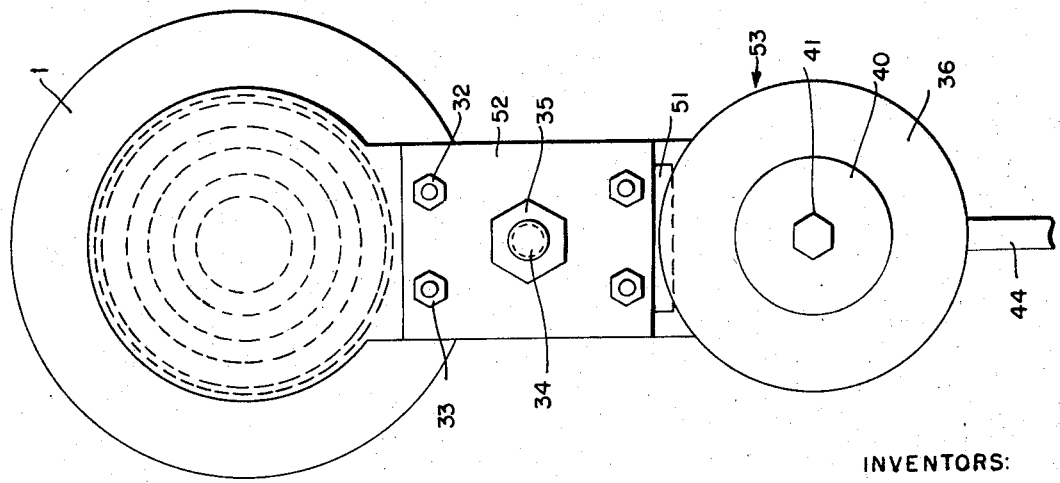

United States Patent Office 3,441,232
Patented Apr. 29, 1969

3,441,232
CUTTING APPARATUS FOR PLASTIC SHEETING
Adolf Diebold, Ludwigshafen (Rhine), Ludwig Raichle, Limburgerhof, Pfalz, and Wilhelm Dussel, Ludwigshafen (Rhine), Germany, assignors to Badische Anilin- & Soda-Fabrik Aktiengesellschaft, Ludwigshafen am Rhine, Germany
Filed Jan. 15, 1965, Ser. No. 425,806
Claims priority, application Germany, Jan. 18, 1964, B 75,049
Int. Cl. B65h 35/02
U.S. Cl. 242—56.7                                5 Claims This invention relates to a process for cutting tapes, for example of coated plastics sheeting, and to apparatus required for the process.

It is known that tapes or plastics sheeting may be cut by passing them between rotating upper and lower blades. The upper and lower blades moving in opposite directions rub against each other. The consequence of this is that the blades are severely worn owing to the constant sliding of metal on metal, and therefore have to be resharpened continually.

Resharpening of the blades must be done carefully so that cut edges are obtained which are free from notches. Nevertheless it is difficult to obtain reproducibly smooth cut edges, especially in the case of tapes of coated sheeting because the coating is hard and has an extreme wearing action on the cutting tools. Constituents of the sheeting material and coating are deposited on the cut edges so that disturbances may occur in winding the cut tapes on the core of the spool. Not only the running properties of the tapes, but also the quality of reproduction of the outer track recordings may be impaired owing to the changes in the cut edges.

It is the object of the present invention to provide a method of cutting plastics sheeting in cutting apparatus having a grooved roller and blades located above the grooved roller, in which disturbance of the cut edges is minimized. Another object of the invention is to provide a method by which the traction exerted on the cut tapes remains constant in spite of changes in the diameter of the spool.

These objects are achieved according to this invention by causing the cutters, during the cutting operation, to move in pendulum fashion in continuous relative movement with respect to the moving plastics sheeting, and thus to penetrate into the grooves provided in a grooved roller in such a way that the point of cutting on the cutting edge is continuously varied.

Apparatus required for carrying out the method comprises a grooved roller having grooves which have a width of at least 0.5 mm., which are rounded off at the top with a radius of 1 mm. and which have a depth of at least 4 mm.

The grooved roller is secured to a motor driven shaft which oscillates concentrically about the axle of the cutter block, the oscillations of the grooved roller being displaced in phase relatively to the oscillations of the cutter. In this way there is a relative movement of the cutter with respect to the surface of the sheeting in every position of the grooved roller.

In order that there may be withdrawal under constant longitudinal traction even with decreasing diameter of the starting spool, a storage spool having a centrifugal drum and equalizing rollers is provided for guiding the sheeting in front of the grooved roller.

To ensure a constant driving moment there are provided, behind the grooved roller in the operational direction, a cleaner and separate driving rolls for securing the cores of the spools and driven via centrifugal couplings having radially arranged tared counter-weights.

The cutting edges of the cutters are advantageously made from hard material in order to achieve long durability.

The cutters are clamped side by side in a cutter head which is mounted in an axle and oscillated about this axle by means of a motor via an eccentric and connecting rod.

It is advantageous to mount all the moving parts, such as guide rolls, grooved rollers, take-up rollers and the cleaners on axles secured to a base plate or shafts mounted at one end in the base plate. Each individual tape can then be taken off laterally without difficulty. To prevent deformation of the axles or shafts even when large tractional forces occur within the tapes, the axles or shafts are secured at one end in the base plate and connected at their free ends to the base plate by a demountable V-shaped or Z-shaped support.

The present invention avoids any stoppage between cutter and sheeting so that the cutting operation proceeds continuously and the entire length of the cutting edges continually takes part in the cutting operation.

The sheeting or coated tape to be cut is unwound from a storage spool and supplied to the cutter head over a number of rollers, for example six compensating rollers and two rubber guide rollers.

To maintain constant traction within the tapes between unwinding and take-up, unwinding and take-up spools are provided with compensating couplings which act as centrifugal regulators.

The couplings are set for a maximum speed of about 50 meters per minute.

The cutter head is designed so that several blades may be placed on one axle according to the width of tape desired, and may be secured rigidly and without vibration between plates.

These blades may be engaged accurately by lever pressure into the middle of the 0.5 mm. wide grooves of a rotating lower roller which is driven by the moving sheeting.

The width of the slots and their rounding are important for satisfactory cutting; they result in the sheeting being laid in the rounding and no longer being in contact with the cutting blade after the cut has been made; damage to the sheeting by the blades is therefore excluded.

To avoid any point cutting which would cause great mechanical wear to the cutter, the method is carried out by causing continuous relative movement between the cutter head and the grooved roller. These relative movements are controlled and are out of phase in time.

The desired type of movement of the cutter head and the grooved roller is produced by a driven steering wheel which is connected rigidly through connecting rods and guide shanks to the cutter head and to the grooved roller serving as a guide roller. Control of the connecting rods is achieved through eccentrics which are out of phase with each other by 90°. The connections of the connecting rods through guide shank, guide roller and cutter head lie in the upward extension of the connecting rod in a point of rotation common to the two connecting rods. The eccentric connections of the connecting rods to the control disc may be spaced from the midpoint of the control disc, for example by 4 or 7 mm.

The connecting rods cause the cutter head and the lower roller to oscillate in such a way that the cutter head with the blades describes a path of 30 mm. in the same time that the grooved roller travels a horizontal path of 8 mm.

When the blades have completed one period, about 145 cm. of sheeting has been cut.

The sheeting which has been cut into the desired width is wound up on spools ready for dispatch. The sheeting, prior to being wound up, must be freed from dust on both sides by cleaners, for example dusters, secured to mandrels. This cleaning may also be effected by blowing or suction. For this purpose the mandrel is made hollow and provided with slots and the cut tapes are passed over them.

Conventional tape width are ¼ inch, ½ inch, 1 inch and 2 inches (6, 12, 24.5 and 49 mm.). Fluctuations in layer thickness which are present in the backing film prior to cutting or may also occur after coating lead, for example in the case of tape lengths of 2000 meters and fluctuations in layer thickness of only 0.001 mm. per 10,000 windings on the coil, to differences of 2 x 5 mm.=10 mm. The consequence of this is that at the thicker parts of the wound tape, the cut tapes become so tightly wound that plastic deformation of the tape takes place and the good winding and running properties of the tape in playback or recording are lost.

This disadvantage may be obviated by the method according to the present invention by mounting the spools on individually driven shafts. According to the invention, the main driving shaft is made hollow and serves as a bearing for the other driving shafts. Each shaft receives its own drive which at the same time may be controlled by its own centrifugal regulation. This regulation takes the form of tared weights with springs in radial arrangement on the driving discs and is designed for an average speed of about 50 meters per minute.

The apparatus is driven by means of a variable motor having a speed of about 5000 r.p.m. via belt drives; the latter are reduced repeatedly via pulleys and make possible a speed of the rubber driving rollers of about 340 r.p.m.

One embodiment of cutting apparatus for plastics sheeting according to this invention will now be described by way of example with reference to the accompanying drawings in which:

FIGURE 1 is a diagrammatic view of the apparatus;
FIGURE 2 is a front view of the grooved roller and the cutter head;
FIGURE 3 is a side view of FIGURE 2;
FIGURE 4 is a diagrammatic section through a take-up head;
FIGURE 5 is a section through a take-up head showing the construction;
FIGURE 6 is a section through the cutting unit; and
FIGURES 7 and 8 are left and right end views of FIGURE 6.

Referring to the drawings, the apparatus for cutting plastics sheeting is assembled on a base plate 54 (FIGURE 1). The individual members for taking up and cutting tapes are mounted side by side on the base plate 54, namely a shaft to receive the sheeting spool 55, shafts for guide rollers 57 for guiding the web of sheeting, a grooved roller 53 and a cutter head 52 above the same, draw-off rollers 58, guide rollers 56 and take-up spools 119. The cutter head 52 takes a number of cutters 51 (FIGURES 2 and 3). The take-up means (FIGURE 4) comprises a bearing housing 102 in which a rotatable clutch plate 104 is mounted on a hollow shaft 121. The front end of the hollow shaft 121 receives a take-up spool 120. The rear end of the hollow shaft 121 serves as a bearing for a pulley 107 which is driven by means of a V-belt 122 and is freely rotatable on the hollow shaft 121.

The inner bore of the hollow shaft 121 serves as a bearing for a main shaft 101 carrying the take-up spool 119 at its front end and being rigidly connected at its rear end with a clutch plate 111. The clutch plates 104 and 111 surround the pulley 107 and are driven therefrom via centrifugal clutch members 108a and 108b.

The take-up apparatus (FIGURE 5) comprises for example the stepped main shaft 101 mounted at the front end in a ball bearing 114; it is driven through clutch plate 111 and its front end serves to receive a ready-for-sale take-up spool 119 having a diameter for example of 300 mm. To ensure constant traction during winding up, the other hollow shafts are driven separately through centrifugal clutches. In the example shown, with two take-up spools, the hollow shaft 121 is arranged around the main shaft 101. The hollow shaft 121 is journalled at the front end in the ball bearing 114 and at the rear end in a conical roller bearing 117. When operating conditions are the same, i.e. when the thickness of the tape to be parted is constant, the two shafts 101 and 121 have the same speed. When a difference in the thickness of the layer occurs, the shafts have the possibility of compensating for the different tape pull by change of speed.

Both shafts are driven by the pulley 107 through the centrifugal clutches 108a and 108b and clutch plates 104 and 111; the clutch lining is made of leather. The clutch plate 111 is rigidly secured to the shaft 101 by a plate 112 and a screw 113.

In this way the clutch plate 104 drives the shaft 121 while the clutch plate 111 drives the main shaft 101. The shafts may carry at their free ends either a take-up spool having a width of for example 50.8 mm. or 25.40 mm. or two spools having a width of 12.65 mm. With a width of the final individual cut tapes of 6.25 mm., four tapes can be wound up simultaneously on each shaft.

The shafts 101 and 121 are journalled in the bearing housing 102 which is screwed rigidly into the vertical stress-free base plate 54 by means of a ring nut 103. The housing 102 carries an axial ball bearing 115, a ball bearing 116 and the conical roller bearing 117. The latter is tightened and held firm by a ring nut 105.

Using the various types of bearing ensures that the shafts do not have either axial or vertical play. To provide adjustment free from play of the inner ring of the conical roller bearing 117, the shaft 121 is held manually and the clutch plate 104 is rotated. The final adjustment is locked by a locknut 106.

The pulley 107 may rotate freely on the main shaft 101 on ball bearings 118 and 123. The two ball bearings are held firm by a spacer bushing 109.

A plurality of take-up means may be provided on the base plate 54 depending on the number of individual spools or on the width of the sheeting to be cut. The width of the cutter head 52 and the grooved roller 53 is then adapted to the width of the sheeting.

The reciprocal coupled movement between the cutter head 52 and the grooved roller 53 is effected by push rods 15 and 16 which engage bolts 9a, 9b via ball bearings 19a, 19b. The bolts 9a, 9b are secured by nuts 20a, 20b. The drive takes place through a driving pulley 21 which is mounted by shaft 26 in two ball bearings 27a, 27b.

The cutting unit consisting of cutter head 52 and grooved roller 53 is shown in detail in FIGURES 6 to 8. The cutters 51 are firmly clamped, for example between plates 29 to 31 (the number of which is determined by the number of individual tapes), by means of threaded rods 32 and nuts 33. The entire cutter head 52 is then secured by means of a centrally arranged threaded rod 34 and a nut 35 to a swinging arm 60 of a main shaft 1. The grooved roller 53 is rotatably mounted opposite to the cutter head 52. The grooved roller 53 comprises a bearing housing 36, stepped in diameter, mounted at both ends in ball bearings 42a and 42b. The inner rings of the ball bearings 42a and 42b are drawn onto a stationary shaft 39. The shaft 39 is mounted in a swinging arm 2 by means of a nut 43. Rings 37 are firmly drawn onto the stepped portion of the bearing housing 36 by a screw ring 38. The rings 37 are recessed about 0.5 mm. to provide space for the outermost portion of the cutter edges. The outer edges of the rings 37 are rounded with a radius of about 1 mm. The inner ring of the outer ball bearing 42a is connected to the shaft 39 via a cover plate 40 by means of a screw 41. The swinging arm 2 is provided at its upper end with a bearing bushing 3 in which is journalled the main shaft 1 via a journal 61.

The grooved roller is accordingly connected via shaft 39 with the swinging arm 2. The upper shaft-like portion of the swinging arm projects into a bearing bushing 5 which in turn is journalled in a bushing 4. The bushing 4 is screwed into the vertical base plate 54 by a nut 6. The base plate 54 is free of inner stress. The swinging arm 2 moves the grooved roller backwards and forwards in an arc having a length of about 12 mm.

In order that the grooved roller 53 can be swung into the cutter head 52, the inner bearing end of the shaft 39 is displaced eccentrically downwards by 5 mm. at the bearing 42b. The swinging in is effected by means of a lever 44, which is a round rod. The distance between the grooved roller 53 and the cutter head 52 is 5 mm. when swung out. This is sufficient for convenient insertion of the sheeting to be cut.

When the cutting operation is being commenced, the lever 44 is slowly swung in again up to the abutments 45 and 46. It then forms an angle of about 120° with the vertical, so that the cutters 51 penetrate to a depth of about 3 mm. into the middle of the grooves of the roller 53. Cutter head 52 and roller 53 are both carried via their swinging arms 2 and 60 by the bearing bushing 4; the swinging arm 2 is mounted rigidly in the journal 61. This is in turn mounted in a hollow stud 62 of the swinging arm 2 and swings backwards and forwards in an orbit. The main shaft 1 carries a lubricating bushing 47 which serves at the same time for lubricating the hollow shaft.

A nut 8 holds firm the hollow stud 62 of the swinging arm 2 in its bearing.

A lever 7 is mounted on the nut 8 and secured by means of a nut 10. The lever 7 effects the cutting movement of the grooved roller 53. The main shaft 1, which is connected at the top with the journal 61, is held by two nuts 11. A lever 12 is secured at the end of the journal 61 by means of a nut 13. The lever 12 effects swinging movement of the cutter head 52. The two levers 7 and 12 are controlled by a control disc 14 carrying the two push rods 15 and 16 in double eccentric arrangement. The eccentric distance of the eccentric from the mid point of the control disc is about 5 mm. for the grooved roller and 52.7 mm. for the cutter head.

The control disc 14 is secured in the driving pulley 21 by means of a conical pin 25. The push rods 15 are held in turn by the three nuts 20a, 20b and 20c and by the control disc 14 itself. The driving pulley 21 with its shaft 26 runs in a bearing housing 22 which is secured to the vertical base plate 54 by means of a ring nut 23. Washer 24 and a screw 28 serve to secure the ball bearing 27a, 27b.

We claim:

1. A method of longitudinally cutting web form plastic sheeting into a plurality of tapes with a cutting apparatus that includes a freely rotatable roller having at least one annular peripheral groove and a cutter having an elongated cutting edge in alignment with said groove, said method comprising the steps of drawing plastic sheeting between said cutter and roller and against said roller, and oscillating said cutter and said roller relative to each other in out of phase pendulum oscillation to cause the cutting edge to enter the groove and cut the sheeting so that the point of cutting contact of the cutting edge with the sheeting is continually changing thereby evenly distributing the wear along the cutting edge.

2. A method of longitudinally cutting web form plastic sheeting into a plurality of tapes with a cutting apparatus that includes a freely rotatable roller having a plurality of annular peripheral grooves and a cutter having a plurality of elongated cutting edges one each in alignment with a groove of said roller, said method comprising the steps of drawing plastic sheeting between said cutter and roller and against said roller, and oscillating said cutter and said roller relative to each other in and out of phase pendulum oscillation to cause the cutting edges to enter the grooves and cut the sheeting so that the point of cutting contact of each of the cutting edges with the sheeting is continually changing thereby evenly distributing the wear along the cutting edges.

3. A cutting apparatus for longitudinally cutting web form plastic sheeting comprising, a freely rotatable cutter roller having at least one annular peripheral groove, a cutter having an elongated cutting edge coacting with said roller groove to freely enter same, means drawing said sheeting between said cutter and roller and against said roller, and means mounting said roller and cutter for establishing such relative movement therebetween that said cutting edge is continually moving to place a different point of said edge in cutting position relative the roller groove thereby evenly distributing the wear along said cutting edge, said means mounting said roller and cutter including supporting members extending therefrom and pivotable about the same axis, and means driving said supporting members in out of phase pendulum oscillations.

4. A cutting apparatus for longitudinally cutting web form plastic sheeting comprising, a freely rotatable cutter roller having a plurality of annular peripheral grooves, a cutter having a plurality of elongated cutting edges one each coacting with a roller groove to freely enter same, means drawing said sheeting between said cutter and roller and against said roller, and means mounting said roller and cutter for establishing such relative movement therebetween that said cutting edges are continually moving to place a different point of each of said cutting edges in cutting position relative the roller grooves and thereby evenly distribute the wear along said edges, said means mounting said roller and cutter including supporting members extending therefrom and pivotable about the same axis, and means driving said supporting members in out of phase pendulum oscillations.

5. A cutting apparatus for longitudinally cutting web form plastic sheeting comprising a sheeting spool for receiving web form plastic sheeting to be cut into individual tapes, a cutting unit for cutting said sheeting into tapes including a freely rotatable cutter roller having a plurality of annular grooves and a cutter head with a plurality of cutting blades coacting with said grooves, mounting means for mounting said cutter roller and cutter head for relative movement to continually change the cutting edges of said blades, said mounting means for said cutter roller and cutter head including supporting members extending therefrom and pivotable about the same axis, means for oscillating in pendulum fashion said supporting members 90° out of phase, a plurality of freely rotatable guide rollers between said sheeting spool and cutting unit to guide said sheeting to and between said cutter roller and cutter head, drive rollers for drawing the cut tapes from the cutting unit, take up rollers for receiving the cut tapes from the drive rollers, and tape guide means between the drive rollers and take up rollers.

References Cited

UNITED STATES PATENTS 762,166   6/1904   Harcher _____ 83—427
1,731,902  10/1929  Lodding _____ 83—435

GEORGE F. MAUTZ, *Primary Examiner.*

U.S. Cl. X.R.

83—433, 435, 490, 503

U.S. DEPARTMENT OF COMMERCE

PATENT OFFICE

Washington, D.C. 20231

UNITED STATES PATENT OFFICE
CERTIFICATE OF CORRECTION

Patent No. 3,441,232            April 29, 1969

Adolf Diebold et al.

It is certified that error appears in the above identified patent and that said Letters Patent are hereby corrected as shown below:

Column 3, line 5, "width" should read -- widths --. Colur 6, line 1, "in and out" should read -- in out --; after line ( insert -- 1,302,414 4/1919 Nerness ---242-56.7 --; after li1 64, insert -- 2,672,932 3/1954 Glassman---242-56.7 --; afte: line 65, insert FOREIGN PATENTS
    307,034    7/1919    Germany
  1,203,092    7/1959    France Signed and sealed this 7th day of July 1970.

(SEAL)
Attest:

Edward M. Fletcher, Jr.            WILLIAM E. SCHUYLER, JR.

Attesting Officer                 Commissioner of Patents